United States Patent
Whitman et al.

(10) Patent No.: US 9,451,329 B2
(45) Date of Patent: Sep. 20, 2016

(54) SYSTEMS, METHODS, AND COMPUTER PROGRAM PRODUCTS FOR PROVIDING CONTEXTUALLY-AWARE VIDEO RECOMMENDATION

(71) Applicant: THE ECHO NEST CORPORATION, Somerville, MA (US)

(72) Inventors: Brian Whitman, New York, NY (US); David Rodger, Arlington, MA (US)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 14/509,396

(22) Filed: Oct. 8, 2014

(65) Prior Publication Data
US 2015/0100987 A1    Apr. 9, 2015

Related U.S. Application Data

(60) Provisional application No. 61/888,191, filed on Oct. 8, 2013.

(51) Int. Cl.
| | |
|---|---|
| *H04N 7/10* | (2006.01) |
| *H04N 7/025* | (2006.01) |
| *H04N 21/482* | (2011.01) |
| *H04N 21/462* | (2011.01) |
| *H04N 21/442* | (2011.01) |
| *H04N 21/435* | (2011.01) |
| *H04N 21/432* | (2011.01) |

(Continued)

(52) U.S. Cl.
CPC ...... *H04N 21/4826* (2013.01); *G06F 17/3082* (2013.01); *G06Q 30/0282* (2013.01); *H04N 21/432* (2013.01); *H04N 21/435* (2013.01); *H04N 21/44222* (2013.01); *H04N 21/4622* (2013.01)

(58) Field of Classification Search
CPC .................. H04N 21/84; H04N 21/8405
USPC .................... 725/32, 34–36, 45, 46
See application file for complete search history.

(56) References Cited

U.S. PATENT DOCUMENTS

| | | | |
|---|---|---|---|
| 2004/0128156 A1* | 7/2004 | Beringer et al. | 705/1 |
| 2007/0050393 A1* | 3/2007 | Vogel et al. | 707/102 |
| 2008/0016092 A1* | 1/2008 | Saito et al. | 707/100 |

(Continued)

FOREIGN PATENT DOCUMENTS

EP    2 207 348 A2    7/2010

OTHER PUBLICATIONS

Adomavicius et al., "Toward the Next Generation of Recommender Systems: A Survey of the State-of-the-Art and Possible Extensions," IEEE, Transactions on Knowledge and Data Engineering, vol. 17, No. 6, pp. 734-749 Jun. 2005.

(Continued)

*Primary Examiner* — Kyu Chae
(74) *Attorney, Agent, or Firm* — Fitzpatrick, Cella, Harper & Scinto

(57) ABSTRACT

Methods, systems and computer program products are provided for providing content recommendation by obtaining metadata associated with a media object, extracting from the metadata a plurality of terms associated with the media object, and mapping at least a portion of the plurality of terms to buckets. A query vector having attributes corresponding to the buckets is used to perform a query on a database storing media object documents having attributes corresponding to the buckets.

21 Claims, 5 Drawing Sheets

(51) Int. Cl.
*G06Q 30/02* (2012.01)
*G06F 17/30* (2006.01)

(56) References Cited

U.S. PATENT DOCUMENTS

| | | | |
|---|---|---|---|
| 2008/0065659 A1* | 3/2008 | Watanabe et al. | 707/100 |
| 2009/0123090 A1* | 5/2009 | Li et al. | 382/305 |
| 2012/0330977 A1* | 12/2012 | Inagaki | 707/749 |
| 2013/0262089 A1 | 10/2013 | Whitman et al. | 704/9 |
| 2013/0262469 A1 | 10/2013 | Whitman | 707/741 |
| 2013/0262471 A1 | 10/2013 | Whitman et al. | 707/742 |
| 2014/0195544 A1 | 7/2014 | Whitman | 707/744 |
| 2014/0279756 A1 | 9/2014 | Whitman | 706/12 |
| 2014/0279817 A1 | 9/2014 | Whitman et al. | 706/52 |
| 2014/0280181 A1 | 9/2014 | Rodger et al. | 707/740 |

OTHER PUBLICATIONS

Int'l Search Report and Written Opinion issued in connection with Int'l Appl'n No. PCT/US2014/059650 on Feb. 13, 2015 (12 pages).

* cited by examiner

SYSTEMS, METHODS, AND COMPUTER PROGRAM PRODUCTS FOR PROVIDING CONTEXTUALLY-AWARE VIDEO RECOMMENDATION

CROSS-REFERENCE TO RELATED APPLICATION

This application claims priority to U.S. Provisional Application No. 61/888,191, filed Oct. 8, 2013, the contents of which are incorporated herein by reference.

BACKGROUND

I. Field

Example aspects described herein generally relate to media recommendation and, more particularly, to video recommendation.

II. Related Art

Video suggestions are everywhere on the Internet. They are at the bottom of Netflix pages, Amazon listing, in iTunes, IMDB, YouTube and Google Play. As entertainment consumption moves from physical media rentals and purchases to on-demand or streaming, the importance of contextually-aware recommendation is dramatically increasing as a core driver of user acquisition, engagement and competitive differentiation. Current approaches to video discovery all suffer from the same well-documented problem: contextual blindness.

Collaborative filtering (CF) based recommendation systems look at usage patterns to determine that the same users like two things ("users who did this also did this"). Typical video recommendation systems based on such CF technology, however, have no understanding of the video, music or game they are recommending because they are unable to actually understand the content.

One technical challenge thus involves providing contextually-aware video recommendation. Typical approaches attempt to combat contextual blindness by using a manual, personal editorial curation approach. While this approach provides a level of content-level awareness, it suffers from obvious shortcomings including lack of scalability, cost, and editorial subjectivity.

A technical challenge in providing contextually-aware recommendation to the video domain involves delivering results that actually understand the video(s) being recommended in a way that solves the contextual blindness problem at scale, addressing the shortcomings of manual editorial approaches as well.

Another technical challenge involves providing such contextually aware video recommendations as a complement to existing systems, in order to overlay a contextual understanding of video content atop user-based and personal editorial offerings, thereby eliminating contextual-blindness at scale and offering a much richer, contextually-aware content discovery experience.

BRIEF DESCRIPTION

In accordance with example embodiments described herein, the problem of contextual-blindness in media object recommendation is avoided by obtaining and analyzing metadata from multiple sources in a manner that provides an understanding of media objects such as videos, and in a manner that solves the contextual-blindness problem at scale. The example embodiments described herein solve this problem by providing methods, systems and computer program products for providing content recommendation including obtaining metadata associated with a media object from a plurality of data sources, extracting from the metadata a plurality of terms associated with the media object, and mapping at least a portion of the plurality of terms to a plurality of buckets.

In one embodiment the methods, systems and computer program products perform generating the plurality of buckets by selecting categorization terms corresponding to a plurality of like-terms associated with a type of media content.

In another example embodiment, the methods, systems and computer program products perform generating the plurality of buckets by clustering the plurality of terms using a plurality of cluster terms and a plurality of definitions including a plurality of references to a plurality of other terms, wherein the cluster terms having the highest scores correspond to the plurality of buckets.

In yet another embodiment, the metadata is extracted from at least one structured data source. In a sub-embodiment, the metadata is explicit metadata.

In a further embodiment, for each bucket of the plurality of buckets, the methods, systems and computer program products perform correlating the plurality of terms associated with the bucket and weighting each bucket based on a correlation value obtained by the correlating.

In another example embodiment, the embodiments perform calculating, for each term of the plurality of terms, a probability that the term is associated with the media object, associating the probability to each term, correspondingly, generating a vector of term-weight attributes based on the associating, generating a document containing at least the vector, and storing the document in a database.

In another example embodiment the methods systems and computer program products perform generating a query vector corresponding to at least one of the plurality of buckets, and querying the database by using the query vector.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

The example embodiments of the invention presented herein are directed systems, methods and computer program products for providing contextually-aware video recommendation. This description is not intended to limit the application of the example embodiments presented herein. In fact, after reading the following description, it will be apparent to one skilled in the relevant art(s) how to implement the following example embodiments in alternative embodiments (e.g., in other domains such as music, games, books, and the like).

The term "video" as referred to herein means a sequence of image frames, that, when played one after the other, makes a video. Examples of a video include: a movie, a streamed video, a broadcast channel, a Video on Demand, and the like. A video may include audio, such as for example, the audio track(s) that relate to and are synchronized with the image frames of the video track(s).

The term "metadata" as referred to herein means data about a media object (i.e., data about data). Metadata typically comes from one of two sources: (1) the digital resource itself by, for example, processing the audio or video content of the digital resource using audio/video recognition analysis, or (2) human beings (e.g., personal reviews, commentary, etc.).

The first kind of metadata is often referred to as "implicit" or "intrinsic" metadata. Such implicit metadata is technical in nature (e.g., involving audio/video signal analysis such as fingerprinting analysis). The second kind of metadata is often referred to as "explicit" or "extrinsic" metadata. Explicit metadata is the most difficult and expensive metadata to create because it requires humans to generate it. In the domain of video recommendation, however, it is also very important to the end user. The embodiments described herein utilize both implicit and explicit metadata from several sources to provide video recommendation.

Figure 1:
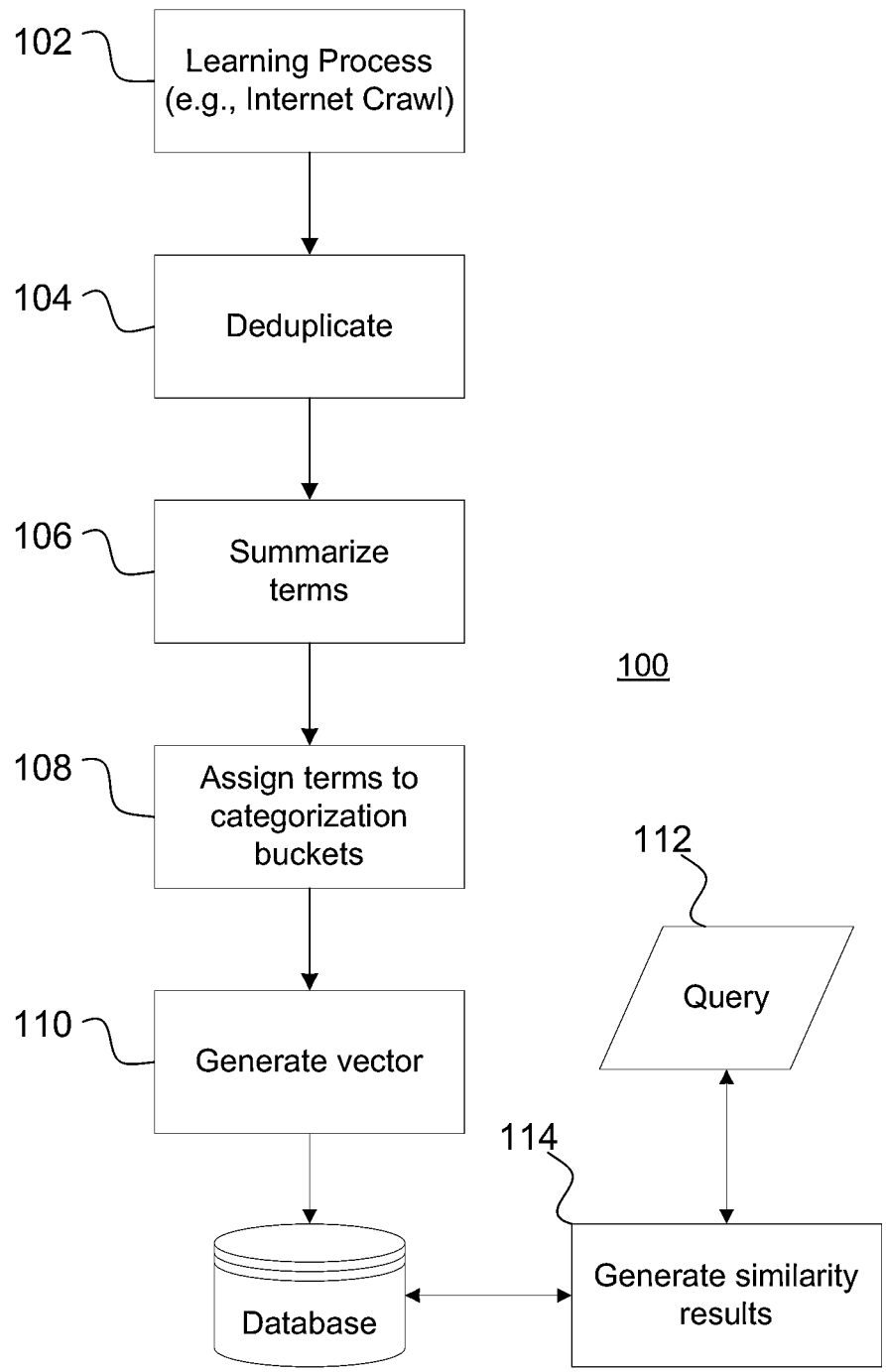
FIG. 1 is an example flow diagram of a contextually-aware video recommendation process performed by an example embodiment of the present invention.

FIG. 1 is an example flow diagram of a contextually-aware video recommendation process 100 performed by an example embodiment of the present invention. In particular, FIG. 1 illustrates a process that may be implemented by and/or performed by a content recommendation system.

Initially, at block 102, a learning process is performed by crawling video-related information across a network such as the Internet. At block 104, the information that is collected is then deduplicated based on, for example, title and year normalization. Other information can be used to normalize the data, including for example, numerical data such as the average star rating of the video or how much money the video made.

Crawling and deduplication can be performed by technologies or techniques currently known or future developed. The information related to, for example, plot descriptions, personal reviews, social media, viewer or fan reactions, and the like can be extracted using text gathering servers as described in U.S. patent application Ser. No. 13/850,044, filed Mar. 25, 2013, entitled "Named Entity Extraction From a Block of Text", the entire disclosure of which is hereby incorporated by reference in its entirety.

The information can be collected from either structured data sources or unstructured data sources, or a combination of both. Structured data sources have at least some understandable organization which can be queried by using a computer to search for pre-determined fields. An example of a structured data source is a movie review site which consistently describes movies using the same organization of information such as title, release date, rating, and the like.

Non-structured data sources typically are not organized but can still store information that may be collected. An example of a non-structured data source is a blog about movies. In one embodiment, only structured data sources storing at least explicit metadata are crawled to collect information about videos. In another embodiment a combination of such structured data sources and non-structured data sources, both containing at least explicit metadata are crawled to collect information about videos. Optionally, only non-structured data sources containing at least explicit metadata are crawled to collect information about videos.

Similarities among videos are dynamically understood in real-time by applying natural language processing (NLP), entity extraction and machine learning in the content domain. Particularly, the data from the various sources (e.g., critic and fan opinions, sentiment and descriptions) are synthesized, to provide a contextual understanding of the content. In block 106, blocks of descriptive text about the content are summarized for the purpose of identifying the most relevant terms (i.e., "top terms") for each video in a database. In one embodiment, probabilities (or "weights") are associated to the terms for each video. Each probability indicates the probability of the corresponding term being associated with the video at a point in time.

Table 1 below is an example of noun phrases, adjectives and unigrams and associated probabilities for the video entitled "The Godfather, Part II", according to an example implementation of the present invention. The probabilities are the probabilities that the terms are associated with the particular media object, in this case a video, and more particularly a movie.

TABLE 1

| noun phrases | P(t) | adjectives | P(t) | unigrams | P(t) |
| --- | --- | --- | --- | --- | --- |
| Sicilian mafia | 0.54 | classic | 0.65 | 20s | 0.11 |
| Hollywood tone | 0.10 | realistic | 0.50 | Sicily | 0.42 |
| sibling relations | 0.15 | rough | 0.25 | saga | 0.42 |
| Oscar winner | 0.24 | serious | 0.54 | crime | 0.84 |
| crumbling marriage | 0.25 | captivating | 0.43 | Italy | 0.63 |
| rise to the top | 0.45 | stylized | 0.15 | ambition | 0.24 |
| gangster films | 0.69 | gloomy | 0.20 | SA | 0.53 |
| criminal heroes | 0.13 | bleak | 0.12 | immigrants | 0.24 |
| multiple stories | 0.21 | epic | 0.54 | Florida | 0.04 |
| blind ambition | 0.13 | atmospheric | 0.43 | 50s | 0.13 |

In block 108, each of these terms is assigned a categorization "bucket" through, for example, a dictionary approach. Buckets include, for example, director, actor, era, plot, mood, occasion, location, acclaim, genre, and the like. In the above example, "gloomy" and "bleak" are mood terms, "Sicilian mafia" and "crime" are plot terms, and so on.

Buckets can be defined manually or automatically. In a manual embodiment, a user (typically an expert movie reviewer, fan or someone otherwise knowledgeable about the various categorization terms associated with videos, generates a list of buckets. Like-terms that have been collected are, in turn, associated to the buckets.

In an automatic embodiment, text clustering techniques can be used to automatically generate buckets. For example, a base indexing engine can be used in combination with a clustering framework, where the clustering framework can be configured to input a corpus of data, plural cluster terms, and definitions which include references to other terms. The data retrieved from the sources is clustered automatically and associated with terms with the highest scores. These terms (i.e., the terms with the highest scores) are defined as the buckets. As in the manual embodiment, like-terms that have been collected are, in turn, associated to the buckets.

In block 110, a cultural vector for every video analyzed is generated to reflect content-level attributes of the video and stored in a database by associating each term with a bucket. In one embodiment, the vector can be updated in real-time.

This allows each vector to be applied to make a wide range of similarity judgments in real time, allowing for contextually-aware, flexible recommendations.

Figure 2:
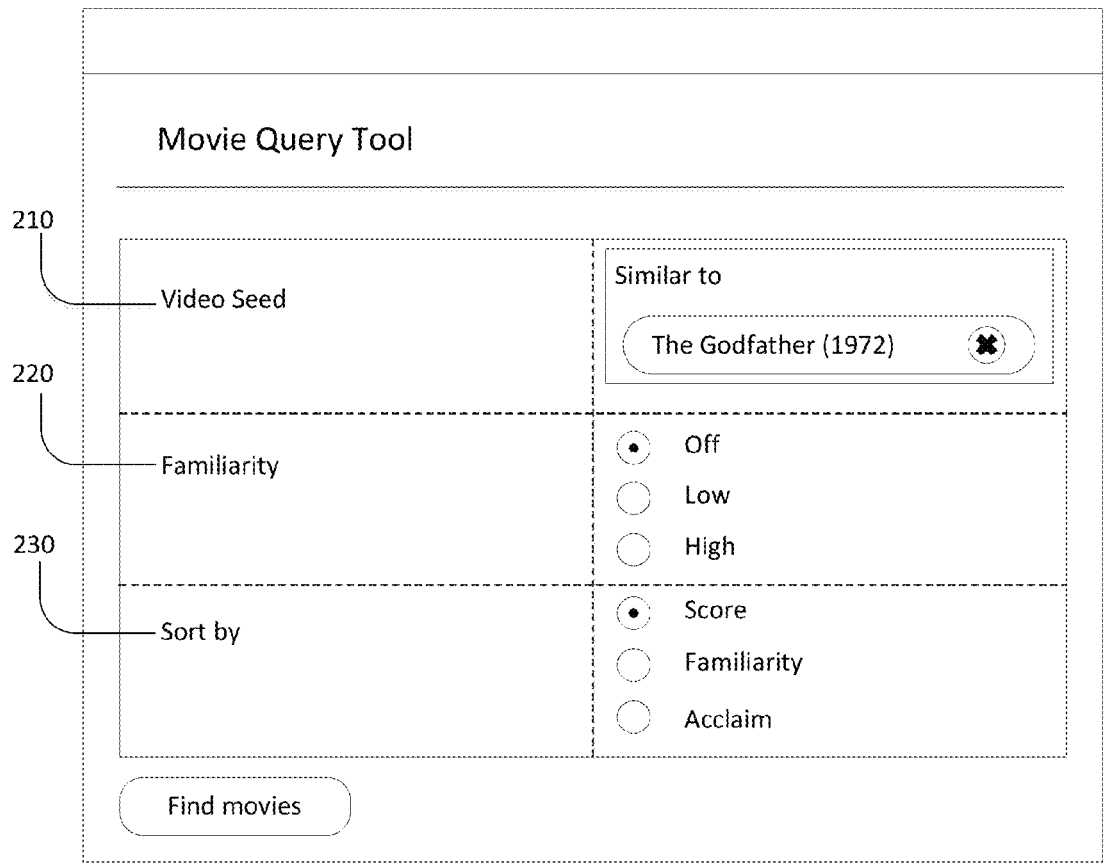
FIG. 2 is a window or screen shot generated by a graphical user interface for entering a seed corresponding to a video in accordance with an example embodiment of the present invention.
Figure 3:
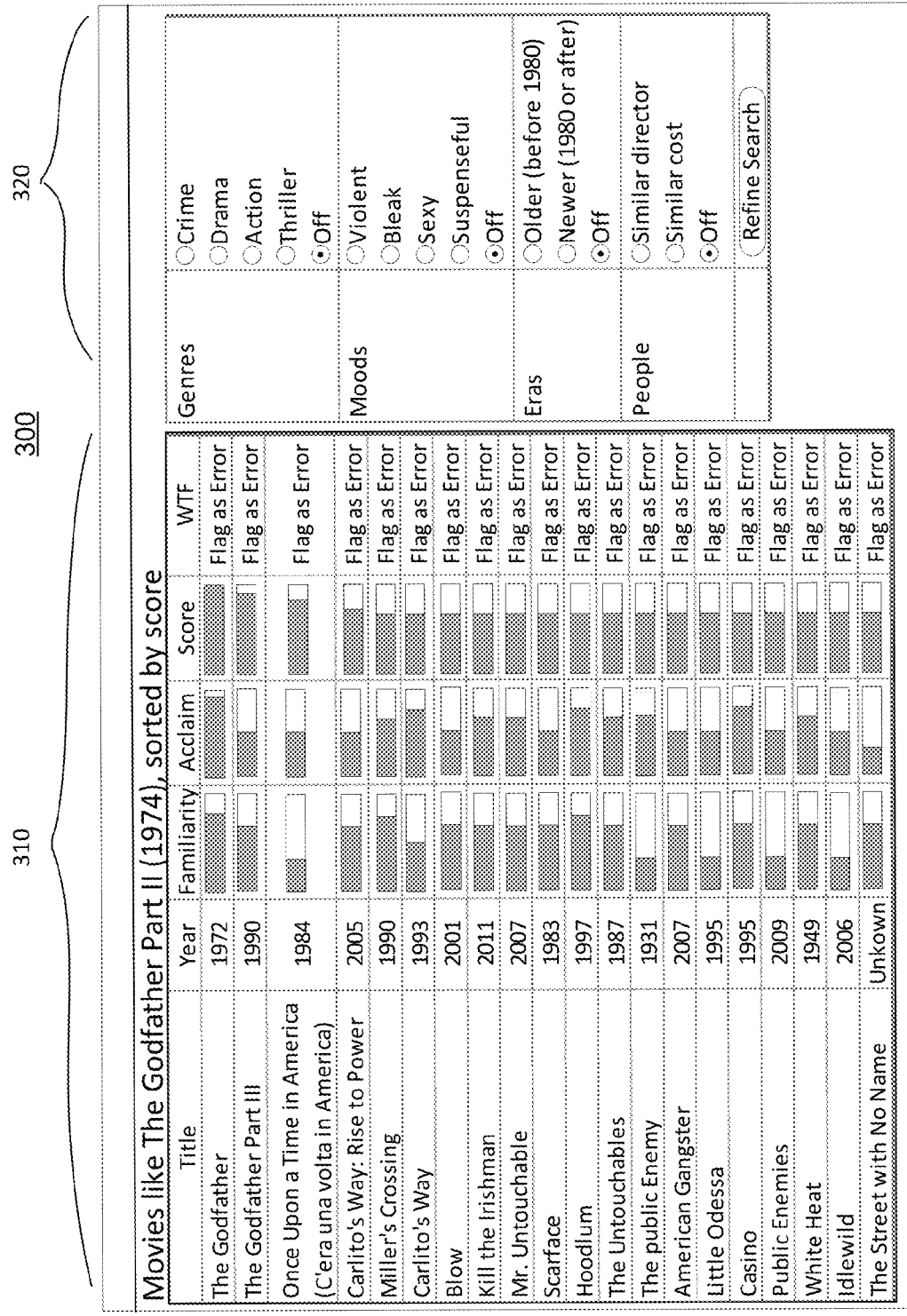
FIG. 3 illustrates a window or screen shot generated by a graphical user interface that allows users to facet, filter or sort by any number of contextual aspects in accordance with an example embodiment of the present invention.

FIG. 2 is a window or screen shot 200 generated by a graphical user interface for entering a seed corresponding to a video in accordance with an example embodiment of the present invention. FIG. 3 illustrates a window or screen shot 300 generated by a graphical user interface that allows users to facet, filter or sort by any number of contextual aspects in accordance with an example embodiment of the present invention, the contextual aspects including, for example:

Genre

Familiarity: the probability of knowing about the video, computed by number of mentions, reviews, ratings and social media activity Acclaim: the probability of critical acclaim, computed by rating stars and amount of reviews and social media activity Computed terms, broken into buckets for style, mood, location, era, genre Cast Director Date of release Identifiers (IDs) and Uniform Resource Locators (URLs) on different public Application Programming Interface (API) content services Studio Computed similar videos and shows Name and foreign names Referring to FIGS. 1, 2 and 3, in block 114 (FIG. 1), baseline similarity results and faceted steering based on a variety of content-level attributes are generated based on a query 112. The query can be in the form of a vector of having corresponding content-level attributes. Certain attributes of the query vector can be weighted more than others. The terms may be weighted based on how important, how often mentioned, or how closely related the term is to the movie.

Referring to FIG. 2, a user can enter, for example, a single seed value (Video Seed 210) for a video and sort based on familiarity, acclaim or raw match score (Sort By 230, Familiarity 220). Once a seed is chosen, a list of matches 310 is returned along with optional facets 320 to narrow the search based on, for example, genre, mood, era, people or other terms, as shown in FIG. 3 (e.g., "Godfather," but in the 'newer era').

It should be understood that other types of interfaces can be uses to communicate a query. For example, an application program interface (API) server having an API server processor, an API server memory, and an API server request queue can be constructed to receive requests to run a recommendation program from an external computer such as a personal home computer, mobile device, and the like. The query can be in the form of a vector having attributes as describe above, where the query is generated by the external computer based on the attributes of a collection of, for example, media objects, anonymized data associated with a user, playlists, and the like. Certain attributes of the query vector can be weighted more than others.

Content-level attributes of videos can be stored in so called "documents", the generation of which is described in more detail below. Documents can be used to build a recommender that automatically finds the types of video(s) a user likes or desires to obtain by filtering the weights using a similarity algorithm. In one embodiment, this layer is implemented by using, for example, taste profile technology described in U.S. patent application Ser. No. 14/214,026, filed Mar. 14, 2014, entitled, "Taste Profile Attributes", the entire disclosure of which is hereby incorporated by reference in its entirety. This allows contextual understanding of content to provide an in-depth contextual understanding of the consumer. One exemplary implementation is now described with reference to FIG. 4

Figure 4:
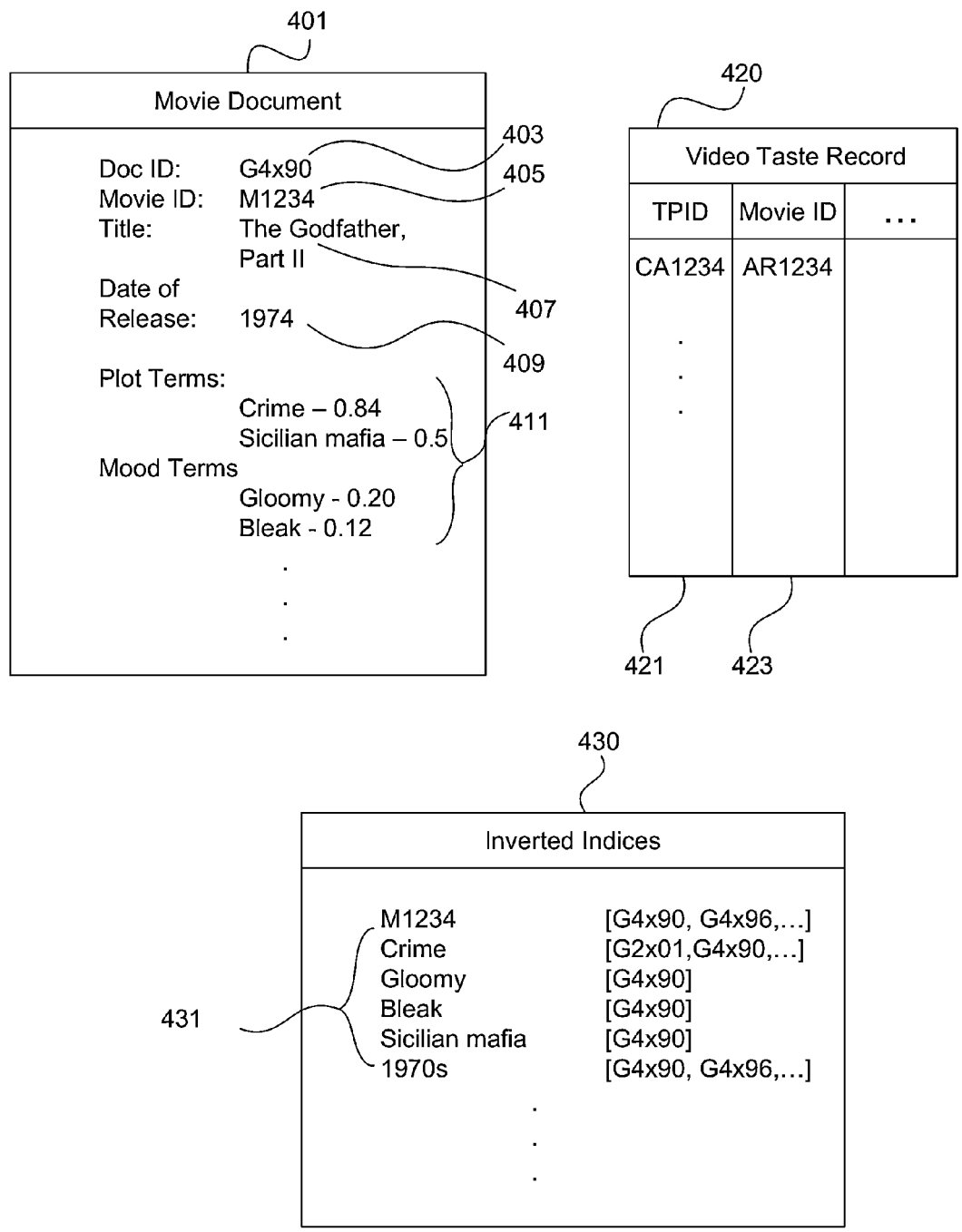
FIG. 4 illustrates shows a document, a video taste record, and inverted indices according to an example implementation of the present invention.

FIG. 4 illustrates a video document 401, a video taste record 420, and inverted indices 430 according to an example implementation. As shown in FIG. 4, document 401 contains a document identifier (ID) 403 which uniquely identifies the document. In this embodiment, the domain concerns movies. In accordance with such a domain, document 401 contains a movie ID 405, a movie title 407, a date of release of the movie 409 and a list of additional terms 411 related to a subject of the domain under consideration and organized under predefined buckets, again, in this example implementation, the movie.

Each of the additional terms is a term-weight pair, where the term is associated with a bucket and the weight indicates how closely the term describes the subject of the content. A wide range of terms can be associated with each video and may be updated at regular intervals, e.g., once per week or month.

For example, one example embodiment might include a data set including over 10,000 terms for each title from various sources of data about movies, along with associated weights.

As described above, the terms can be sorted into buckets, such as genre, familiarity, style, mood, location, era, cast, director, date of release, IDs and URLs on different public API content services, studio, computed similar videos and shows, name and foreign names, and the like. In this example implementation, the movie "the Godfather, Part II" is associated with a vector of terms including "crime", "Sicilian mafia", "gloomy", "bleak", etc., with corresponding weights of 0.84, 0.5, 0.2, and 0.12.

FIG. 4 also illustrates an entry in a taste profile 420, which contains records indicating user video (and/or other) tastes. In one example embodiment, a taste profile is a representation of video activity, and can include a wide range of information such as movies watched, ratings by the user, date of viewing by the user, start/stop/skip data for portions of the movie, contents of collections, user rankings, preferences, or mentions, etc.

A data source may be constructed to contain records as inverted indices 430 in which terms are indexes to documents for movie titles. For example, the terms 431 "Crime", "Gloomy", "Bleak" and "Sicilian mafia" might index to a document for the movie "The Godfather, Part II".

By applying a contextual understanding of the user as a video fan (e.g., how adventurous the user is, how important critical acclaim is to the user, whether the user prefers dark dramas on the weekends to lighter comedies during the week), video personalization can be taken to a much more engaging and insightful level than current collaborative filtering systems.

In one embodiment, the buckets themselves can be used to correlate to a user's preferences (or "tastes") by computing a self-similarity term score for each bucket. In this embodiment, the overall similarity of terms across each bucket in each taste profile of plural taste profiles is computed. For example, if a bucket within a taste profile includes similar terms, such as "crime noir" and "gangster film" for the plot bucket, this would indicate a high self-similarity term score. If a bucket within a taste profile includes dissimilar terms, such as "sad" and "happy" for the mood bucket, this would indicate a low self-similarity term score.

The self-similarity term scores, in turn, are used to weight the buckets per user to generate personalized recommendations. Thus, based on their viewing (or listening) activities, the taste profiles identify which buckets the users care about most. For example, if all the terms within a certain bucket have a high correlation (e.g., "crime" and "Sicilian mafia" under the bucket "plot"), then that correlation is utilized to weight plot more heavily than buckets having a relatively lower correlation of associated terms (e.g., "sad" and "funny" under the bucket "mood"). This allows a recommender to weight one or more buckets (e.g., plot terms) more heavily for a particular taste profile.

In another embodiment, a query vector need not be based on buckets associated with a taste profile. Instead, weights can be manually added to a query vector. A user who typically watches movies that have "crime" plots who desires to now watch a comedy, for example, can manually weight "comedy" higher.

The application of a contextual understanding of the video as described above can be used to build an in-depth taste profile on a user by learning more about the user as a video fan to understand what attributes inform the overall preferences of the user. The taste profile thus serves as a repository for a specific user's content activity (e.g., what the user watches in the domain of videos and what the user listens to in the domain of music) and an analysis layer that makes specific insights to understand that entertainment consumer: How adventurous are your tastes? Are you a fan of different types of entertainment on weeknights than on weekends? By expanding the universe of content understood within a taste profile, the application of contextual fan understanding is thus expanded, opening up a wide range of new applications and use cases. This also provides a mechanism for providing cross-media recommendation.

In this use case, as an understanding of content expands to include music, episodic television and ultimately other forms of digital entertainment, connections across content types can be made, enabling cross-media recommendation. One example implementation of this approach is applying a consumer's music preference to predict likely video preference. An example implementation of cross-media recommendation is described in U.S. patent application Ser. No. 14/213,749, filed Mar. 14, 2014, entitled "Cross Media Recommendation", which is hereby incorporated by reference in its entirety. Similarly, such cross-media recommendation can be expanded across other media types on a single device or platform including music, videos, apps, games and books.

Figure 5:
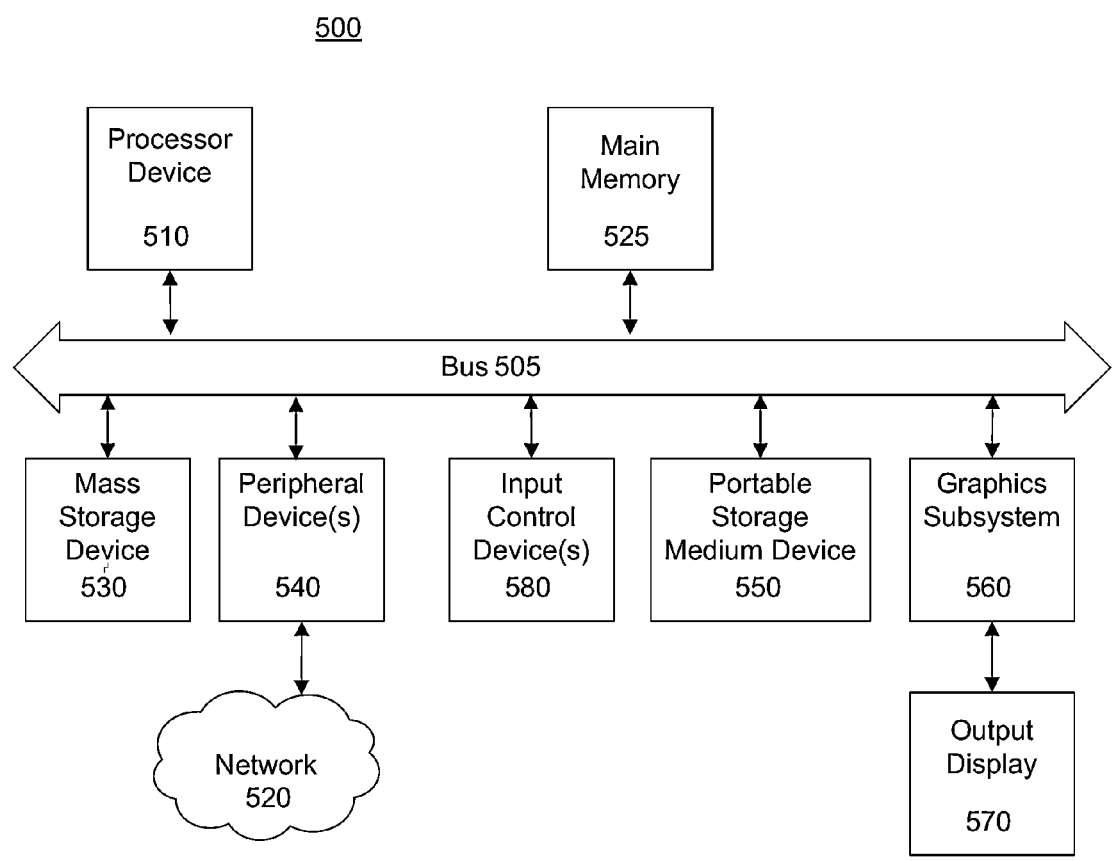
FIG. 5 is a block diagram of a device for use with various example embodiments of the invention.

FIG. 5 is a block diagram of a general and/or special purpose computer 500, which may be a general and/or special purpose computing device, in accordance with some of the example embodiments of the invention. The computer 500 may be, for example, a user device, a user computer, a client computer and/or a server computer, among other things.

The computer 500 may include without limitation a processor device 510, a main memory 525, and an interconnect bus 505. The processor device 510 may include without limitation a single microprocessor, or may include a plurality of microprocessors for configuring the computer 500 as a multi-processor system. The main memory 525 stores, among other things, instructions and/or data for execution by the processor device 510. The main memory 525 may include banks of dynamic random access memory (DRAM), as well as cache memory.

The computer 500 may further include a mass storage device 530, peripheral device(s) 540, portable non-transitory storage medium device(s) 550, input control device(s) 580, a graphics subsystem 560, and/or an output display interface 570. For explanatory purposes, all components in the computer 500 are shown in FIG. 4 as being coupled via the bus 505. However, the computer 500 is not so limited. Devices of the computer 500 may be coupled via one or more data transport means. For example, the processor device 510 and/or the main memory 525 may be coupled via a local microprocessor bus. The mass storage device 530, peripheral device(s) 540, portable storage medium device(s) 550, and/or graphics subsystem 560 may be coupled via one or more input/output (I/O) buses. The mass storage device 530 may be a nonvolatile storage device for storing data and/or instructions for use by the processor device 510. The mass storage device 530 may be implemented, for example, with a magnetic disk drive or an optical disk drive. In a software embodiment, the mass storage device 530 is configured for loading contents of the mass storage device 530 into the main memory 525.

The portable storage medium device 550 operates in conjunction with a nonvolatile portable storage medium, such as, for example, a compact disc read only memory (CD-ROM), to input and output data and code to and from the computer 500. In some embodiments, the software for storing information may be stored on a portable storage medium, and may be inputted into the computer 500 via the portable storage medium device 550. The peripheral device(s) 540 may include any type of computer support device, such as, for example, an input/output (I/O) interface configured to add additional functionality to the computer 500. For example, the peripheral device(s) 540 may include a network interface card for interfacing the computer 500 with a network 520.

The input control device(s) 580 provide a portion of the user interface for a user of the computer 500. The input control device(s) 580 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the computer 500 may include the graphics subsystem 560 and the output display 570. The output display 570 may include a cathode ray tube (CRT) display and/or a liquid crystal display (LCD). The graphics subsystem 560 receives textual and graphical information, and processes the information for output to the output display 570.

Each component of the computer 500 may represent a broad category of a computer component of a general and/or special purpose computer. Components of the computer 500 are not limited to the specific implementations provided here.

Software embodiments of the example embodiments presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer-readable media further include software for performing example aspects of the invention, as described above.

Included in the programming and/or software of the general and/or special purpose computer or microprocessor are software modules for implementing the procedures described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-4 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method of providing a database of content-level attributes associated with media objects, the method comprising:
    performing on at least one computer of a content recommendation system, the at least one computer having a query interface for receiving a query containing at least one content-level attribute, the steps of:
    obtaining, by crawling a network using a server adapted to gather text data, metadata associated with a media object from a plurality of data sources, wherein at least one of the plurality of data sources is an unstructured data source and the metadata includes extrinsic metadata corresponding to one or more content-level attributes of the media object;
    extracting from the metadata a plurality of terms associated with the media object by applying an entity extraction model to the metadata;
    mapping at least a portion of the plurality of terms to a plurality of buckets using an indexing engine in combination with a clustering framework configured to cluster the plurality of terms to categorization terms associated with each bucket;
    calculating, for each term of the plurality of terms, a probability that the term is associated with the media object;
    associating the probability to each term, correspondingly;
    generating a vector of content-level attributes corresponding to the media object based on the associating;
    storing the vector of content-level attributes in a database;
    receiving via the query interface a query vector containing at least one of the content-level attributes;
    searching the database for at least one content-level attribute contained in the query vector; and
    providing, in response to the searching, a query result containing the media object.

2. The method according to claim 1, further comprising:
    generating the plurality of buckets by selecting categorization terms corresponding to a plurality of like-terms associated with a type of media content.

3. The method according to claim 1, further comprising:
    generating the plurality of buckets by clustering the plurality of terms using a plurality of cluster terms and a plurality of definitions including a plurality of references to a plurality of other terms, wherein the cluster terms having the highest scores correspond to the plurality of buckets.

4. The method according to claim 1, wherein the metadata is extracted from at least one structured data source.

5. The method of claim 1, further comprising:
    for each bucket of the plurality of buckets:
        correlating the plurality of terms associated with the bucket; and weighting each bucket based on a correlation value obtained by the correlating.

6. The method according to claim 1, further comprising: generating a document containing at least the vector; and storing the document in the database.

7. The method of claim 6, further comprising: generating a query vector having the at least one content-level attribute corresponding to at least one of the plurality of buckets; and querying the database by using the query vector.

8. A system for providing a database of content-level attributes associated with media objects, the system comprising:
at least one computer of a content recommendation system, the at least one computer having a query interface for receiving a query containing at least one content-level attribute;
a server adapted to gather text data and operable to:
obtain, by crawling a network, metadata associated with a media object from a plurality of data sources, wherein at least one of the plurality of data sources is an unstructured data source and the metadata includes extrinsic metadata corresponding to one or more content-level attributes of the media object and a database,
wherein the at least one computer is operable to:
extract from the metadata a plurality of terms associated with the media object by applying an entity extraction model to the metadata,
map at least a portion of the plurality of terms to a plurality of buckets using an indexing engine in combination with a clustering framework configured to cluster the plurality of terms to categorization terms associated with each bucket,
calculate, for each term of the plurality of terms, a probability that the term is associated with the media object;
associate the probability to each term, correspondingly;
generate vector of content-level attributes corresponding to the media object based on the associating;
store the vector of content-level attributes in the database;
receive via the query interface a query vector containing at least one of the content-level attributes;
search the database for at least one content-level attribute contained in the query vector; and
provide, in response to the searching, a query result containing the media object.

9. The system according to claim 8, the at least one computer of the content recommendation system further operable to:
generate the plurality of buckets by selecting categorization terms corresponding to a plurality of like-terms associated with a type of media content.

10. The system according to claim 8, the at least one computer of the content recommendation system further operable to:
generate the plurality of buckets by clustering the plurality of terms using a plurality of cluster terms and a plurality of definitions including a plurality of references to a plurality of other terms, wherein the cluster terms having the highest scores correspond to the plurality of buckets.

11. The system according to claim 8, wherein the metadata is extracted from at least one structured data source.

12. The system according to claim 8, the at least one computer of the content recommendation system being further operable to:
for each bucket of the plurality of buckets:
correlate the plurality of terms associated with the bucket; and
weight each bucket based on a correlation value obtained by the correlating.

13. The system according to claim 8, the at least one computer of the content recommendation system being further operable to:
generate a document containing at least the vector; and
store the document in the database.

14. The system according to claim 13, wherein the at least one computer of the content recommendation system is further operable to:
generate a query vector having the at least one content-level attribute corresponding to at least one of the plurality of buckets; and
query the database by using the query vector.

15. A non-transitory computer-readable medium having stored thereon one or more sequences of instructions for causing one or more processors to perform on at least one computer of a content recommendation system, the at least one computer having a query interface for receiving a query containing at least one content-level attribute, the steps of:
obtaining, by crawling a network using a server adapted to gather text data, metadata associated with a media object from a plurality of data sources, wherein at least one of the plurality of data sources is an unstructured data source and the metadata includes extrinsic metadata corresponding to one or more content-level attributes of the media object;
extracting from the metadata a plurality of terms associated with the media object by applying an entity extraction model to the metadata;
mapping at least a portion of the plurality of terms to a plurality of buckets using an indexing engine in combination with a clustering framework configured to cluster the plurality of terms to categorization terms associated with each bucket;
calculating, for each term of the plurality of terms, a probability that the term is associated with the media object;
associating the probability to each term, correspondingly;
generating a vector of content-level attributes corresponding to the media object based on the associating;
storing the vector of content-level attributes in a database;
receiving via the query interface a query vector containing at least one of the content-level attributes;
searching the database for at least one content-level attribute contained in the query vector; and
providing, in response to the searching, a query result containing the media object.

16. The computer-readable medium of claim 15, further having stored thereon a sequence of instructions for causing the one or more processors to perform:
generating the plurality of buckets by selecting categorization terms corresponding to a plurality of like-terms associated with a type of media content.

17. The computer-readable medium of claim 15, further having stored thereon a sequence of instructions for causing the one or more processors to perform:
generating the plurality of buckets by clustering the plurality of terms using a plurality of cluster terms and a plurality of definitions including a plurality of references to a plurality of other terms, wherein the cluster terms having the highest scores correspond to the plurality of buckets.

18. The computer-readable medium of claim 15, wherein the metadata is extracted from at least one structured data source.

19. The computer-readable medium of claim 15, further having stored thereon a sequence of instructions for causing the one or more processors to perform:
    for each bucket of the plurality of buckets:
        correlating the plurality of terms associated with the bucket; and
        weighting each bucket based on a correlation value obtained by the correlating.

20. The computer-readable medium of claim 15, further having stored thereon a sequence of instructions for causing the one or more processors to perform:
    generating a document containing at least the vector; and
    storing the document in the database.

21. The computer-readable medium of claim 20, further having stored thereon a sequence of instructions for causing the one or more processors to perform:
    generating a query vector having the at least one content-level attribute corresponding to at least one of the plurality of buckets; and
    querying the database by using the query vector.

* * * * *